United States Patent
Pettitt (10) Patent No.: US 7,165,847 B2
(45) Date of Patent: Jan. 23, 2007

(54) METHOD AND SYSTEM FOR LIGHT PROCESSING USING A GOLD SEGMENT

(75) Inventor: Gregory S. Pettitt, Rowlett, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/746,224

(22) Filed: Dec. 23, 2003

(65) Prior Publication Data

US 2005/0134808 A1    Jun. 23, 2005

(51) Int. Cl.
    *G03B 21/14* (2006.01)
    *G03B 21/00* (2006.01)
    *G02F 1/1335* (2006.01)
    *G02B 5/22* (2006.01)
    *H04N 9/12* (2006.01)

(52) U.S. Cl. .......................... 353/84; 353/31; 349/106; 359/502; 359/891; 348/743

(58) Field of Classification Search ............... 353/84, 353/30, 31, 34, 37, 82, 98, 99; 359/502, 359/891, 618; 349/80, 106; 348/742, 743
See application file for complete search history.

(56) References Cited

U.S. PATENT DOCUMENTS

| | | | | |
|---|---|---|---|---|
| 1,562,066 | A * | 11/1925 | Shaw | 430/15 |
| 5,233,385 | A | 8/1993 | Sampsell | 355/35 |
| 5,650,832 | A | 7/1997 | Poradish et al. | |
| 6,002,452 | A | 12/1999 | Morgan | |

(Continued)

OTHER PUBLICATIONS

Darren Meyer, WPI CS Department, Color Theory and Pre Press: meyerd@cs.WPI.EDU; (pp. 1-4).
Yajima, R. et al., "Wide-Color Gamut System, " Proc. of SMPTE, Advanced Television and Electronic Imaging, San Francisco, CA, 1995, pp. 112-119.
Yamaguchi et al., "Multi-Primary Color Display Using a Holographic Optical Element," Proceedings of the SPIE—The International Society for Optical Engineering, 1998, vol. 3293, pp. 70-77.
Ajito, T. et al., "Multi-Primary Color Display for Liquid Crystal Display Projectors Using Diffraction Grating," Optical Engineering, Nov. 1999, vol. 38, No. 11, pp. 1883-1888.
Ajito et al., "Six-Primary Color Projection Display for Expanded Color Gamut Reproduction," Proceedings of International Symposium on Multi-Spectral Imaging and Color Reproduction for Digital Archives, Society of Multi-Spectral Imaging of Japan, 1999, pp. 135-138.
Ajito, T. et al., "Expanded Color Gamut Reproduced by Six-Primary Projection Display," Proceedings of SPIE, 2000, vol. 3954, pp. 130-137.

*Primary Examiner*—W. B. Perkey
*Assistant Examiner*—Rochelle Blackman
(74) *Attorney, Agent, or Firm*—Charles A. Brill; Wade James Brady, III; Frederick J. Telecky, Jr.

(57) ABSTRACT

A method for generating images includes shining a beam of light through a filter wheel to produce filtered light. The filter wheel includes red, green, and blue color segments and a fourth color segment that is not blue, green, red, or clear. The method also includes modulating the filtered light to form an image.

17 Claims, 7 Drawing Sheets

U.S. PATENT DOCUMENTS

| | | |
|---|---|---|
| 6,040,876 A | 3/2000 | Pettitt et al. ................. 348/624 |
| 6,256,073 B1 | 7/2001 | Pettitt ......................... 348/743 |
| 6,324,006 B1 | 11/2001 | Morgan |
| 6,453,067 B1 | 9/2002 | Morgan et al. ............. 382/162 |
| 6,594,387 B1 | 7/2003 | Pettitt et al. ................. 382/167 |
| 6,621,529 B2 | 9/2003 | Ohara et al. ................. 348/743 |
| 2002/0109821 A1* | 8/2002 | Huibers et al. ............... 353/84 |
| 2002/0186350 A1* | 12/2002 | Peterson ....................... 353/29 |

* cited by examiner

| SEGMENT | DEGREES |
|---------|---------|
| G | 55 |
| R | 55 |
| W | 15 |
| B | 55 |
| G | 55 |
| R | 55 |
| W | 15 |
| B | 55 |
| TOTAL | 360 |

FIG. 2B

SPECTRUM LOCUS
Rec. 240M (xy)
△ RGB WHITE
□ WHITE GROUPS
◇ SECONDARY SEGMENTS
▽ RGB SECONDARIES
— MODEL
× REFERENCE COLORS

| SEGMENTS | DEGREES |
|---|---|
| B | 100 |
| W | 17 |
| R | 58 |
| G | 55 |
| Y | 17 |
| R | 58 |
| G | 55 |

METHOD AND SYSTEM FOR LIGHT PROCESSING USING A GOLD SEGMENT

TECHNICAL FIELD OF THE INVENTION

This application relates generally to display systems and more particularly to a method and system for light processing using at least four non-white color sectors.

BACKGROUND OF THE INVENTION

Many projection display systems use a single light modulator in combination with a white light source to produce a full color image. In order to produce a full color image, the white light source is filtered sequentially to produce a primary colored light beam that changes over time. Typically, a color wheel is used to allow a series of primary-colored filters to be spun through the white light beam in rapid succession. As each filter passes through the light beam, the light beam becomes a primary color beam with the active primary color determined by the portion of the color wheel that is passing through the optical path.

During each primary color period, data for the appropriate color is provided to a spatial light modulator to enable the modulator to create a series of single color images. If the single color images are created in a rapid sequence, the viewer's eye integrates the series of images to give the perception of viewing a single full-color image.

In the past, in addition to three primary colors, color wheels with an additional segment that is clear is used to allow white light to pass directly through the wheel and be combined with the primary colors. These clear segments are often referred to as white segments. White segments are generally utilized to increase the brightness of the resulting image.

SUMMARY OF THE INVENTION

A method for generating images includes shining a beam of light through a filter wheel to produce filtered light. The filter wheel includes red, green, and blue color segments and a fourth color segment that is not blue, green, red, or clear. The method also includes modulating the filtered light to form an image.

Some embodiments of the invention provide numerous technical advantages. Other embodiments may realize some, none, or all of these advantages. For example, in one embodiment, a method for displaying images and an associated display system is provided that allows accurate color selection of a desired color. For example, according to one embodiment, white light of approximately 9,500° Kelvin can be achieved, which has been determined to be a more desirable version of white than currently produced. This may be achieved while maintaining brightness at acceptable levels. Further, in addition to achieving this particular color, the teachings of the embodiments of the invention allow selection of almost any particular color to be displayed, without significant degradation of desirable brightness levels.

Other technical advantages are readily apparent to one skilled in the art from the following figures, descriptions, and claims.

BRIEF DESCRIPTION OF THE DRAWINGS

For a more complete understanding of embodiments of the invention, reference is made to the following description, taken in conjunction with the accompanying drawings, in which.

DETAILED DESCRIPTION OF THE INVENTION

Embodiments of the invention and its advantages are best understood by referring to FIGS. 1 through 6 of the drawings, like numerals being used for like and corresponding parts of the various drawings.

Figure 1:
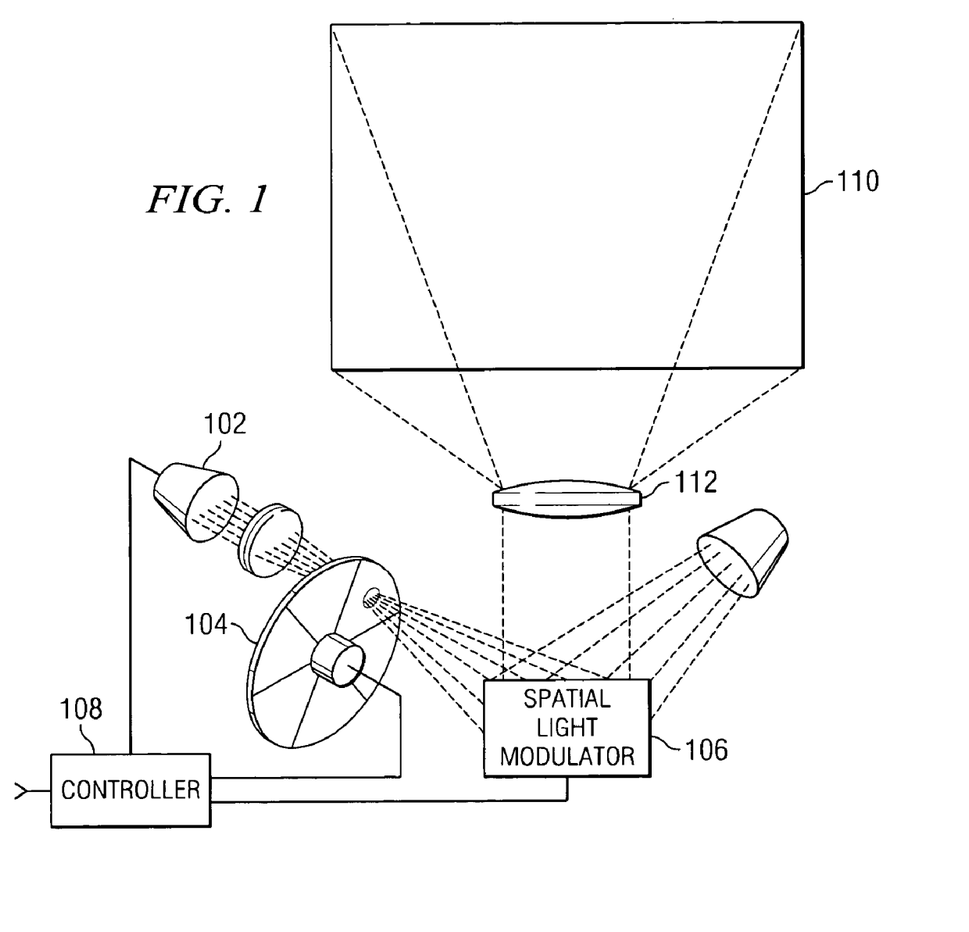
FIG. 1 is schematic diagram of a color display.

FIG. 1 is schematic diagram of a color display system 100. In display system 100, light from source 102 is focused onto a spinning color wheel 104. Spinning color wheel 104 creates a beam of light that changes from one primary color to the next in rapid sequence. The primary color beam of light impinges a light modulator 106. Light modulator 106 may be a spatial light modulator or a temporal light modulator. Light modulator 106 may take many forms, including a deformable micro-mirror device (DMD) available from Texas Instruments.

A controller 108 receives a video signal and sends image data to the light modulator 106 in synchronization with color wheel 104. Image data representing each color portion of the image is sent during the period in which that particular color filter is passing through the beam of light. The modulated light is focused onto an image plane projection lens 112 to form an image of the colored filter. The process repeats as various colored filters pass through the path of the light beam. The eye of the viewer integrates the color images giving a perception of a single full color image.

Figure 2A:
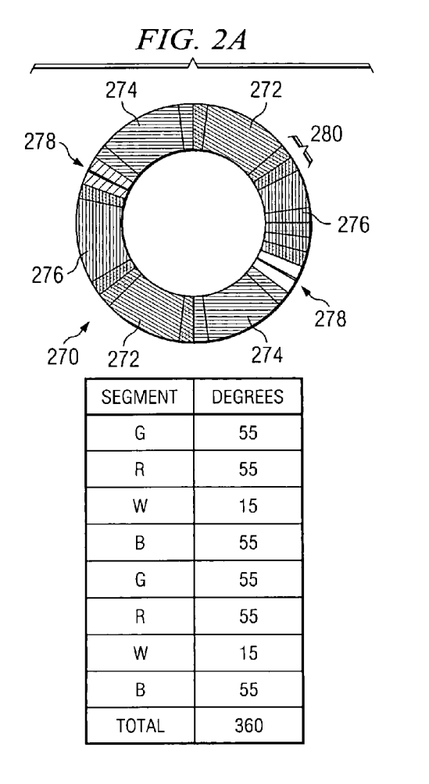
FIG. 2A is a schematic diagram showing a conventional color wheel.

FIG. 2A is a schematic diagram of a color wheel 270 that may be used in color display system 100. Color wheel 270 includes four color segments including red, green, blue, and clear or white. As illustrated, color wheel 270 includes two green segments 272, two blue segments 274, two red segments 276, and two white segments 278. According to one conventional usage, each green, red, and blue segment is 55° while the white segments are 15°. As illustrated, color wheel 270 includes a plurality of spokes 280. Spokes 280 occur at the junction of two color segments where the beam of light 102 is large enough such that it intersects two different colors at the same time. The portion intersected by the beam of light is referred to as a spoke.

Figure 2B:
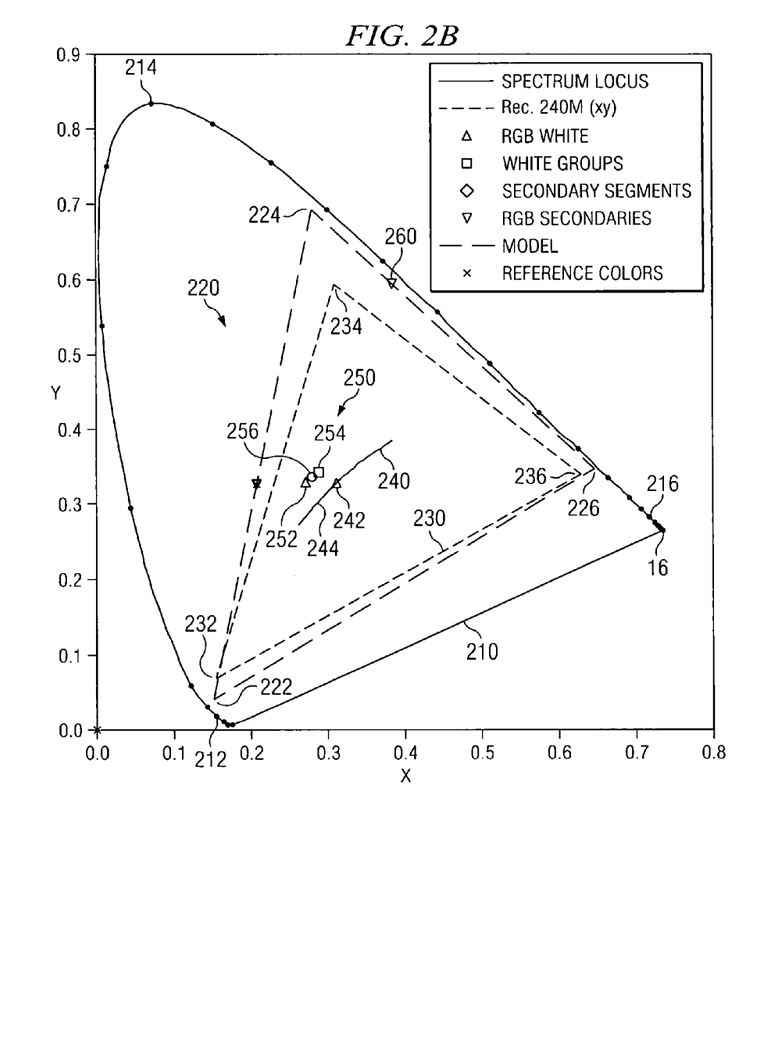
FIG. 2B is a chromaticity graph showing a color gamut for the color wheel of FIG. 2A; that may be used in the system of FIG. 1.

FIG. 2B is a chromaticity graph showing a plurality of color gamuts for color wheel 270 of FIG. 2A. Color wheels conventionally were utilized with only the three primary colors of red, green, and blue. Then, as described in U.S. Pat. No. 5,233,385, assigned to Texas Instruments, it was recognized that the addition of a white color segment to a color wheel utilizing red, green, and blue segments, could be used to increase brightness of the resulting image. Thus, conventional usage today involves three primary color segments to produce the various colors, as well as a white color segment to add brightness to the resulting color.

Illustrated in FIG. 2A are color gamuts 210, 220, and 230. The ordinate and abscissa of the graph of FIG. 2B are the well known chromaticity parameters with luminescence extending into and out of the page.

Color gamut 210 represents colors having a single wavelength of light. In general, point 212 represents blue, which may have a wavelength of a little less than four hundred and fifty nanometers. Point 214 represents a single wavelength green having a wavelength of about five hundred and twenty nanometers. Point 216 represents a single wavelength red having a wavelength of a little over six hundred and fifty nanometers. In practice, most light used to generate images is not composed of merely a single wavelength, but is composed of a variety of wavelengths. To describe a particular color, a chromaticity graph is utilized, such as the one in FIG. 2B.

Color gamut 220 illustrates the range of colors (including the interior of color gamut 230) that may be theoretically produced according to system 100 using color wheel 270. Vertices of this color gamut are represented by point 222, corresponding generally to a blue color, point 224, corresponding generally to a green color, and point 226, corresponding to a generally red color.

By contrast, color gamut 230 represents the range of colors theoretically possible through conventional CRT display systems. This color gamut 220 is bounded by points 232, corresponding generally to a blue color, point 234, corresponding generally to a green color, and point 236, corresponding generally to a red color. Through the use of color gamut 230, a plurality of colors can be produced by combining various proportions of red, blue, and green. In general, any color that falls along the line connecting any of the two vertices can be generated through a combination of the proper proportion of each of the two colors corresponding to the vertices. For example, point 260, corresponding generally to yellow, can be formed through a combination of green point 224 and red point 226.

With respect to color gamut 230, the version of white that is conventionally produced using this color gamut corresponds to point 242. This is approximately 6500° Kelvin white. Note that this temperature of white lies along curve 240. Curve 240 corresponds generally to the various temperatures of white that are emitted by the sun. By contrast, points 250, including points 252, 254, and 256, correspond to the versions of white that may be practically produced by color gamut 230. Point 252 corresponds to the white that is produced by only the red, green, and blue segments of color wheel 270. In contrast point 254 corresponds to the white that is produced through clear segments on the color wheel. Point 256 corresponds to full on white, meaning that it is the white that results when the RGB white and clear segment white are combined. It has been determined that these versions of white are not as desirable to the eye as those that would lie along curve 240. In particular, it has been determined that a more desirable white would correspond to point 244 which is roughly 9500° Kelvin white. Utilizing color gamut 220 does not provide a practical way to produce these desirable versions of white. Although theoretically any color within the given triangular color gamut could be produced, such desirable whites could only be produced through extreme losses of luminescence, which would be undesirable.

The teachings of the invention recognize that by providing an additional color segment on the color wheel 104, that this additional color segment could be utilized in combination with the other color segments to produce almost any desired color, and in particular desirable shades of white, without resulting in significant losses in luminescence. In particular, and with reference to FIG. 2C, one reason that color gamut 220 may not be utilized effectively to produce the desirable versions of white is described.

Figure 2C:
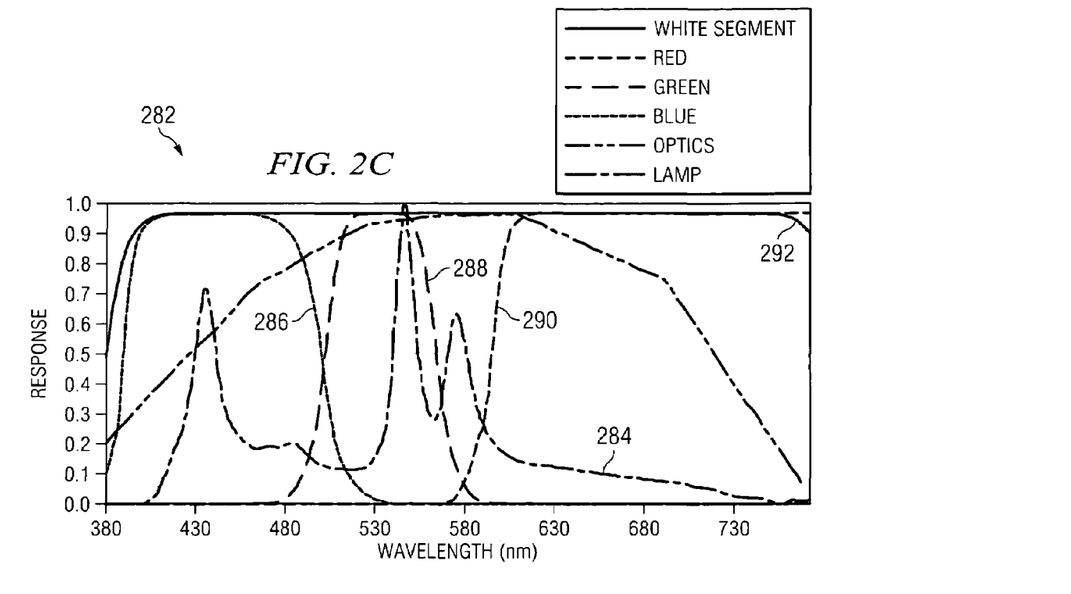
FIG. 2C is a graph illustrating deficiencies in the use of the color wheel of FIG. 2A.

Graph 282 of FIG. 2C includes a plurality of curves. Curve 284 is the spectral response of one example lamp conventionally used with the system of FIG. 1. Graphs 286, 288, and 290 show the frequency response for the various color segments of color wheel 104. Curve 292 shows the frequency response of the white or clear segment of color wheel 104. Because the system optics have a severe roll off in the blue region, the version of white that results has a lower color temperature than desired, resulting in a white point that is more yellowish-green. This white point corresponds to points 252, 254, and 256.

Figure 3A:
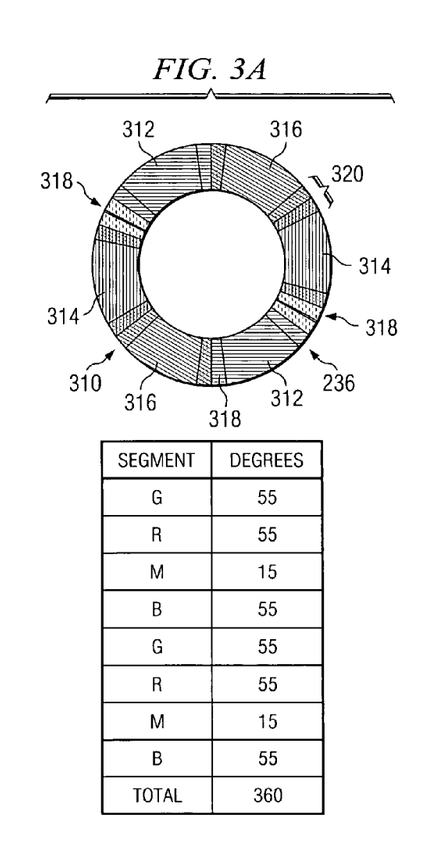
FIG. 3A is a schematic diagram showing a color wheel according to the teachings of the invention.

FIG. 3A is a schematic diagram illustrating color wheel 310 according to the teachings of the invention. Color wheel 310 is analogous to color wheel 270 except that the clear or white portions of color wheel 270 have been replaced with magenta sections. Thus color wheel 310 includes two blue sections 312, two red sections 314, two green sections 316, and two magenta sections 318. Note that color wheel 310 also includes spokes 320. Although the particular portion of each color wheel may be determined as desired, for one embodiment each of the blue, green, and red sections are 55° of the color wheel and the magenta section is 15°. As described with reference to FIG. 3B, color wheel 310 results in more desirable versions of white.

Figure 3B:
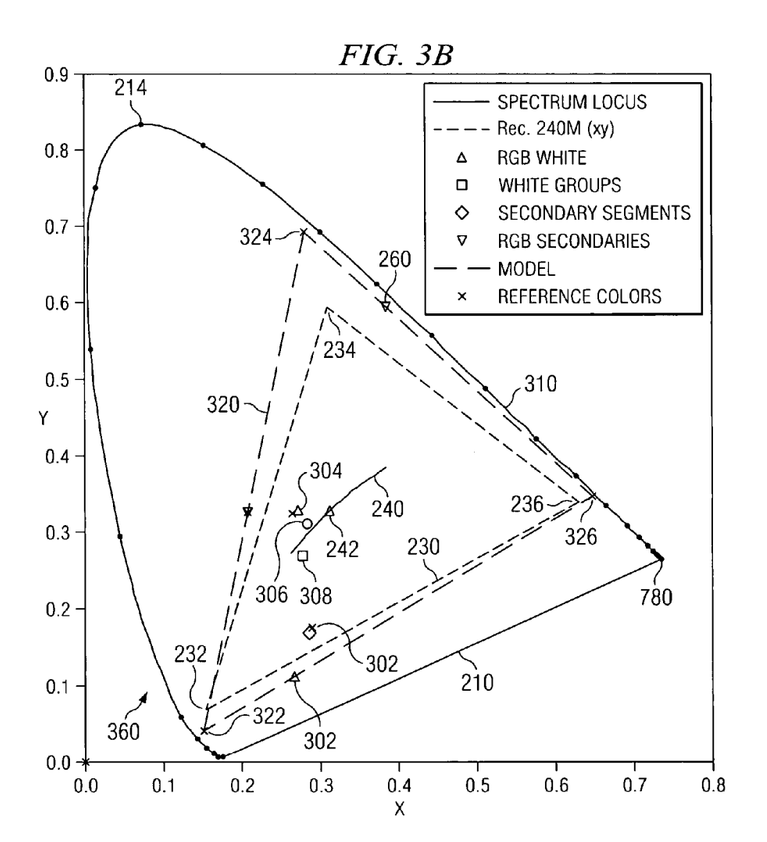
FIG. 3B is a chromaticity graph showing a color gamut associated with the color wheel of FIG. 3A.

FIG. 3B is a chromaticity graph showing a color gamut for color wheel 310. The graph of FIG. 3B is analogous to the graph of FIG. 2B, except that FIG. 3B includes point 302 corresponding to a magenta segment on color wheel 310. Color gamut 320 is analogous to color gamut 220 except that it includes magenta point 302. Vertices 322, 324, and 326 of FIG. 3B correspond to vertices 222, 224, and 226 of FIG. 2B. By including a portion of color wheel 310 that is magenta, a fourth color may be utilized in combination to produce desirable shades of white. As illustrated in FIG. 3B, shades of white corresponding to points 304, 306, and 308 may be achieved. Point 304 corresponds to whites obtained from red, green, and blue segments only. This point is the same as point 252. Point 308 is the white that results from just the spokes of color wheel 310. Point 306 is the white that results from use of red, green, and blue light as well as magenta segments, including the spokes. As illustrated, this point lies very close to curve 240, which as described before is desirable and in particular lies fairly close to a 9500° Kelvin white.

Thus, according to the teachings of the invention particular shades of white, and particular shades of non-white colors, can be selected and utilized, without undue harmful effects on overall luminescence. In addition to replacing, in this example, white segments with magenta segments white segments may be additionally included instead of being replaced in order to add additional brightness, which was their purpose in FIG. 2A. It should also be noted that the teachings of the present invention may also be implemented in conjunction with copending application "Discrete White Color Processor", having an attorney docket number of TI-35625.

Figure 3C:
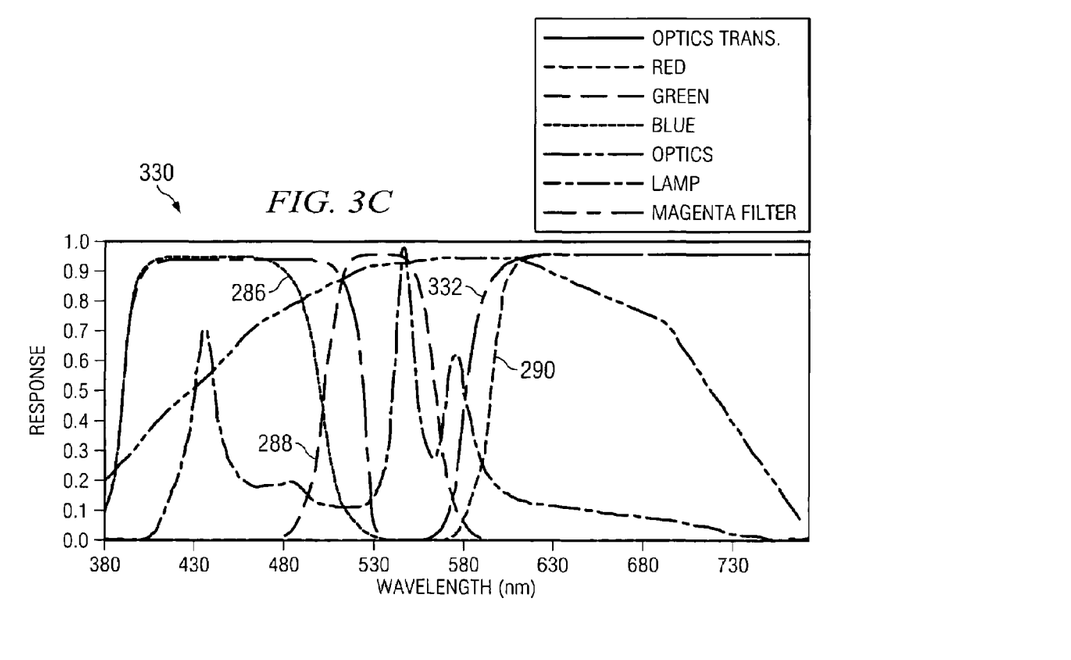
FIG. 3C is a graph illustrating a positive result achieved from the use of the color wheel of FIG. 3A.

FIG. 3C illustrates desirable operation of color wheel 310. A plurality of curves are illustrated in 330 of FIG. of 3B; however, the only curve that is added from the curve from graph 282 of FIG. 2C is curve 332. Curve 332 represents the spectral response of the magenta color filters 318. The magenta filter rejects the green-yellow portion of the spectra which is what made the version of light associated with FIG. 2C undesirable. This results in a color that when mixed with the RGB white and the spoke whites, result in a desirable bluish-white point, approximating a 9500° Kelvin.

Figure 4A:
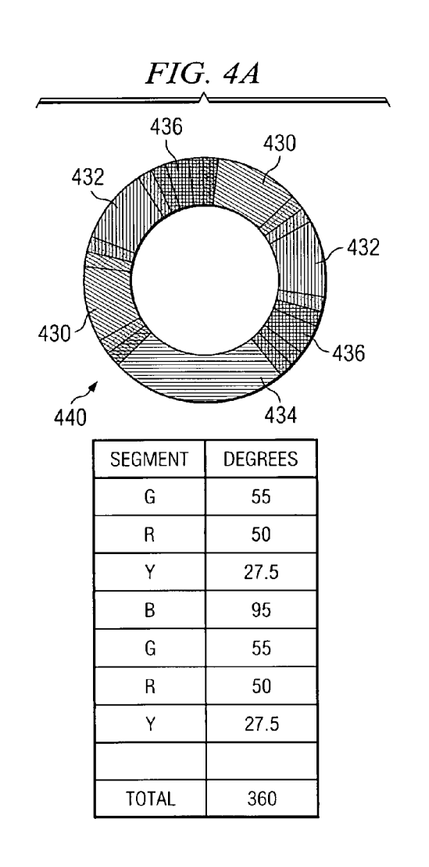
FIG. 4A is a schematic diagram of another embodiment of a color wheel according to the teachings of the invention.
Figure 5A:
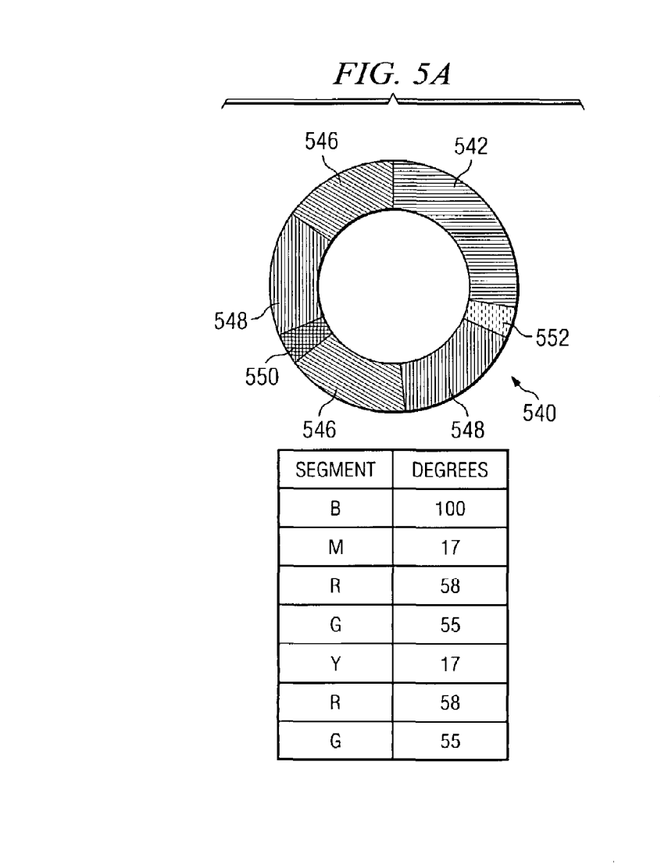
FIG. 5A is a schematic diagram of a color wheel according to yet another embodiment of the present invention.
Figure 6:
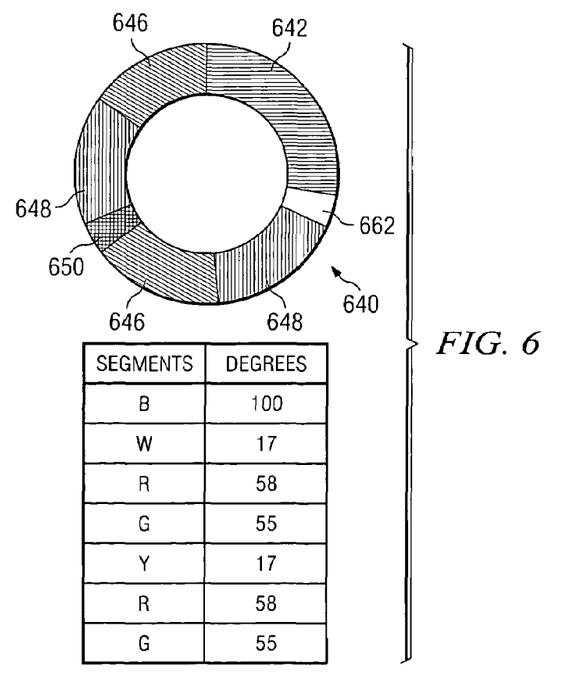
FIG. 6 is a color wheel according to yet another embodiment of the teachings of the invention.

The teachings of the invention are applicable to a variety of other non-white colors in addition to magenta. FIGS. 4, 5, and 6 describe additional examples.

FIG. 4A illustrates an additional color wheel 440 according to teachings of the invention. As illustrated in FIG. 4A, color wheel 440 includes a pair of green segments 430, a pair of red segments 432, a single blue segment 434, and a pair of gold segments 436. In this example, each green segment is 55° of the color wheel, each red segment is 50° of the color wheel, the single blue segment is 95° of the color wheel, and the gold segments are each 27.5° of the color wheel. Although a particular distribution of the color segment is illustrated, other allocations may be utilized. It should be noted that only one color segment 434 is utilized because less time is required for single segments than for split segments.

Figure 4B:
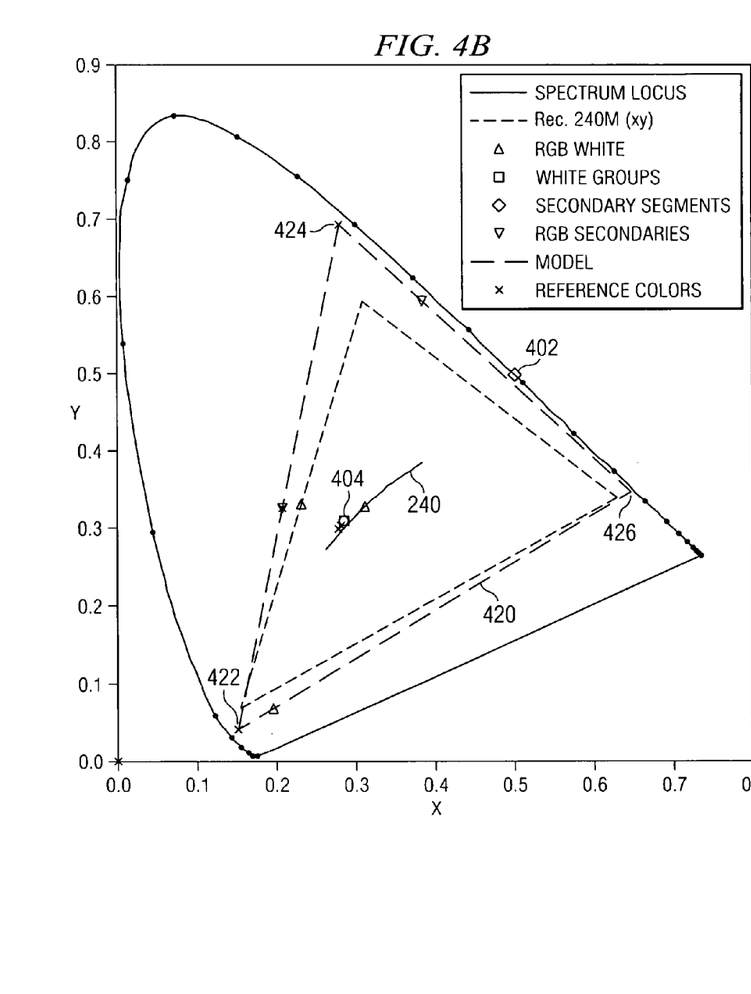
FIG. 4B is a chromaticity graph illustrating a color gamut associated with the color wheel of FIG. 4A.

FIG. 4B is a chromaticity graph illustrating a color gamut 420 associated with color wheel 440 of FIG. 4A. Color gamut 420 includes vertices 422, 424, and 426 corresponding generally to blue, green, and red, respectively. It should be noted that the vertices of color gamut 420 differ somewhat from those of color gamuts 220 and 320 because they arise from a color wheel having different proportions of red, green, and blue than in those color gamuts. Point 402, corresponding to the gold color (or reddish yellow), and such gold color is also provided on the color wheel of FIG. 4A, labeled with a "Y". As illustrated in this example, full-on white, corresponding to point 404 lies directly on top of curve 240, which as described above corresponds to desirable versions of white. Thus, color wheel 440 of FIG. 4A provides an additional example of generation of desirable white colors according to the teachings of the invention, through the use of a fourth non-white color in the color wheel.

Figure 4C:
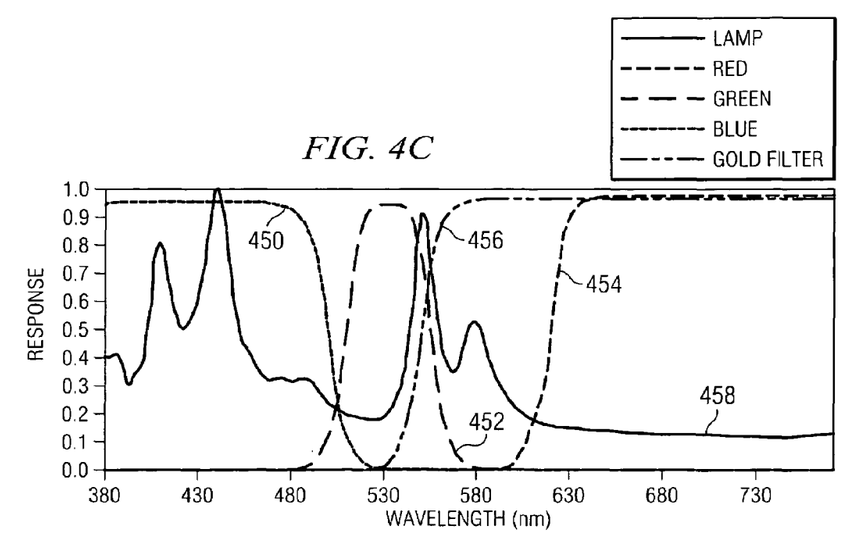
FIG. 4C is a graph illustrating the desirable operation of the color wheel of FIG. 4A.

FIG. 4C is a graph illustrating the desirable operation of color wheel 440 of FIG. 4B. FIG. 4C includes curve 450, corresponding to the spectral response of the blue filter, curve 452, corresponding to the spectral response of the green filter, and curve 454, corresponding to the spectral response of the red filter. In addition, a curve 456 is provided that corresponds to the spectral response of gold filter. Curve 458 is the spectral response of the lamp utilized in this embodiment. It should be noted that this lamp has a different spectral response than the lamp utilized in FIG. 2C and FIG. 3C. In this example, the gold filter adds gold light that is needed to produce the desired white point. This provides the ability to produce very large color gamuts with color wheel based systems.

Figure 5B:
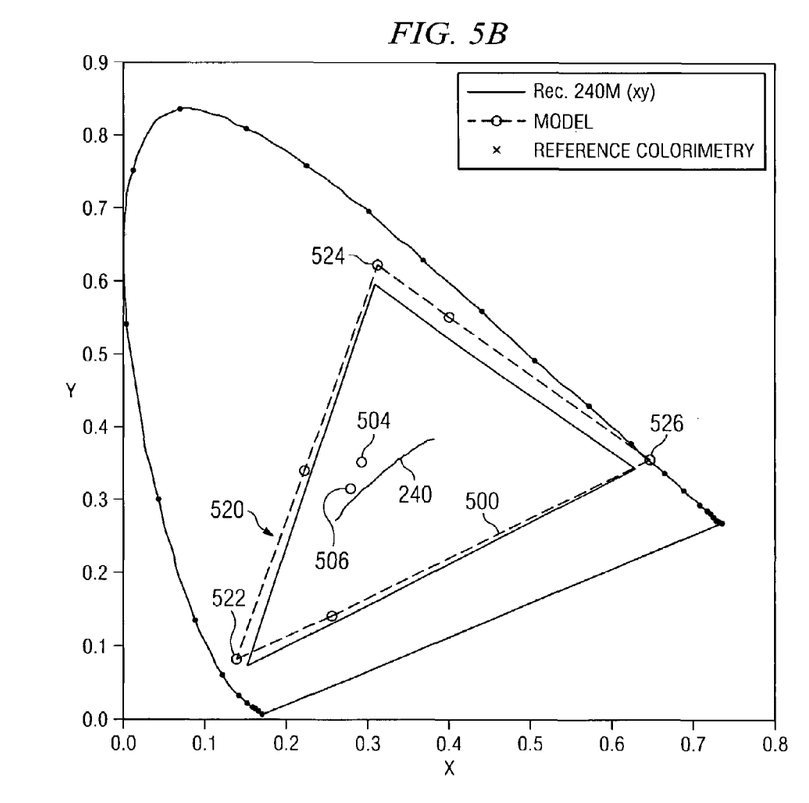
FIG. 5B is a chromaticity graph illustrating a color gamut associated with the color wheel of FIG. 5A.

FIGS. 5A and 5B show yet another embodiment of the present invention. FIG. 5A illustrates a color wheel 540 according to yet another embodiment of the invention. FIG. 5B is a chromaticity chart illustrating color gamuts associated with the color wheel 540 of FIG. 5B. As illustrated in FIG. 5A, color wheel 540 includes a pair of green segments 546, and a pair of red segments 548, and a single blue segment 542. In addition, two non-white color segments 552 corresponding to magenta, and 550 corresponding to gold, are utilized. It should be noted that an additional white segment may be utilized to add brightness to any resulting color.

As illustrated in FIG. 5B, color gamut 520 having vertices 522, 524, and 526, corresponding to blue, green, and red respectively, is generated from color wheel 540 (points corresponding to the gold and magenta segments are not illustrated in this figure). As illustrated, white points 504 and 506, which lie close to desirable curve 240, are generated through the use of color wheel 540. Point 504 corresponds to the use of the white that results from red and red/green pulse enhanced spokes. Point 506 results from white that is generated from blue and blue/magenta pulse enhanced spokes. Thus, in addition to using a single non-white color in addition to the three primary colors, the teachings of the invention are applicable to the use of more than one non-white segment in addition to the three primary non-white segments.

FIG. 6 illustrates yet another embodiment of a color wheel 640 according to the teachings of the invention. Color wheel 610 is analogous to color wheel 540, except that instead of using five non-white color segments, color wheel 610 uses four non-white segments in conjunction with a fifth segment that is white. As illustrated, segments 642, 646, and 648 correspond to blue, green, and red segments, respectively, and segments 650 and 662 correspond to yellow and white (or clear), respectively. The use of a fourth non-white color allows the selection of a particular color, as described above, while the use of a white color allows for increasing brightness levels.

Although embodiments of the invention have been described in detail, a person skilled in the art could make various alterations, additions, and omissions without departing from the spirit and scope of the present invention, as defined by the appended claims.

What is claimed is:

1. A method for generating an image comprising:
   shining a beam of light through a filter wheel to produce filtered light, the filter wheel having at least four color filter segments including a red, a green, a blue, and a gold color filter segment; and
   modulating the filtered light to form an image.

2. The method of claim 1, wherein at least one of the color segments is magenta.

3. The method of claim 1, wherein at least one of the color segments is cyan.

4. The method of claim 1, wherein at least one of the color segments is yellow.

5. The method of claim 1, wherein the filter wheel comprises a red segment, a green segment, a blue segment, a clear segment, and an additional color filter segment.

6. The method of claim 5, wherein the additional color filter segment is magenta.

7. The method of claim 5, wherein the additional color filter segment is an additional gold color segment.

8. The method of claim 1, wherein modulating the filtered light comprises modulating the filtered light to produce approximately 6500° Kelvin white light.

9. A method for generating images comprising:
shining a beam of light through a filter wheel to produce filtered light, the filter wheel comprising two 55° red segments, two 55° green segments, and two 55° blue segments; and
modulating the filtered light to form an image.

10. A method for generating images comprising:
shining a beam of light through a filter wheel to produce filtered light, the filter wheel comprising two 55° red segments, two 55° green segments, and two 55° blue segments and at least one magenta segment; and
modulating the filtered light to form an image.

11. A method for generating images comprising:
shining a beam of light through a filter wheel to produce filtered light, the filter wheel comprising a 100° blue segment, a 116° red segment, a 110° green segment, a 17° gold segment, and a 17° magenta segment, and
modulating the filtered light to form an image.

12. A display system comprising:
a light source operable to produce a beam of white light along a first light path;
a filter wheel on the first light path operable to filter the beam of white light, the filter wheel having a plurality of color segments comprising a gold color segment; and
a light modulator operable to receive filtered light from the filter wheel and modulate the received light to produce an image.

13. The display system of claim 12, comprising a magenta segment.

14. The display system of claim 12, comprising a red, green, blue, and clear segment.

15. The display system of claim 12, comprising a cyan segment.

16. The display system of claim 12, comprising a yellow segment.

17. The system of claim 12, comprising a clear segment.

* * * * *